United States Patent [19]

Schardein

[11] 4,376,801
[45] Mar. 15, 1983

[54] SELECTIVE COATING FOR SOLAR COLLECTORS

[75] Inventor: Daniel J. Schardein, Richmond, Va.

[73] Assignee: Reynolds Metals Company, Richmond, Va.

[21] Appl. No.: 379,616

[22] Filed: May 19, 1982

[51] Int. Cl.$^3$ .............................. B32B 9/00; F24J 3/02
[52] U.S. Cl. .................................... 428/336; 428/339; 428/408; 428/457; 428/421; 428/467; 428/497; 126/417; 126/901; 427/228
[58] Field of Search ............... 428/339, 338, 408, 467, 428/421, 497, 457; 126/901

[56] References Cited

U.S. PATENT DOCUMENTS

| | | | |
|---|---|---|---|
| 2,016,139 | 10/1935 | Eddison | 148/19 |
| 2,384,493 | 9/1945 | Rolle | 117/46 |
| 3,208,447 | 9/1965 | Laslo | 126/270 |
| 3,720,499 | 3/1973 | Hirayama et al. | 428/408 X |
| 4,036,206 | 7/1977 | Straub | 126/270 |
| 4,222,373 | 9/1980 | Davis | 428/408 X |

FOREIGN PATENT DOCUMENTS 729604   5/1955   United Kingdom .

*Primary Examiner*—P. Ives
*Attorney, Agent, or Firm*—Lyne, Girard & McDonald

[57] ABSTRACT

A selective solar coating for solar collectors is disclosed. The coating is characterized by its high absorptance and low emittance. The coating comprises an organic compound or substance having a high molecular weight and a high carbon content, such as a petroleum, vegetable or animal oil, fat or wax, which is pyrolyzed to produce a carbon black pigmented varnish.

6 Claims, No Drawings

SELECTIVE COATING FOR SOLAR COLLECTORS

BACKGROUND OF THE INVENTION

Solar collectors are routinely formed with a black, solar receptive surface, to increase the absorptance of the collector. A common material for this coating is black paint. While black paint has a high absorptance, in the range of about 0.95, this material suffers from a high emittance, which is also in the range of about 0.95. Thus, while a black painted solar collector collects a great amount of solar energy, black painted solar collectors also permit much of this energy to escape. Black paint has often been used as a solar collector coating, however, due to its low cost.

It is, therefore, the primary object of the present invention to produce a solar collector coating material which provides a high absorptance level and maintains the low cost achieved by black paint, while reducing emittence levels, to thereby increase the amount of energy retained by the collector and transferred for solar heating.

THE PRESENT INVENTION

According to the present invention, these objectives have been obtained. The selective solar coating of the present invention comprises an organic compound or mixture of compounds characterized by a high carbon content and a high molecular weight. Either animal or vegetable oils, fats and waxes, as well as petroleum products (hydrocarbons) and synthetics have been found to produce a carbon pigmented varnish on a metallic surface following a controlled pyrolysis. The selective solar coating of the present invention has a high absorptance for solar energy, preferably in excess of about 0.9, and a low emittance of thermal energy of about 0.3 to 0.4. The low emittance results from the thinness of the coating after pyrolyzing.

DETAILED DESCRIPTION OF THE PREFERRED EMBODIMENTS

In accordance with the present invention, the surfaces of a solar collector which are to be exposed to solar energy are first coated with an organic compound or substance having a high carbon content and a high molecular weight. Vegetable oils, such as castor, corn, tung, soy and palm, have all been found to be suitable coating materials. Likewise, animal materials such as lard, butterfat and beeswax and certainly petroleum hydrocarbons also produce satisfactory solar coatings. Synthetic materials, such as vinyl polymers, can also be pyrolyzed to produce solar selective coatings. The coating material could be 100% of the organic compounds or mixtures thereof or could be diluted in a suitable solvent, such as toluene, kerosene or mineral spirits. The percentage of the solvent in the coating composition is selected to produce a desired viscosity for coating of the composition onto the solar collector. The composition may be coated onto the collector by means such as spraying, roller coating or brush coating, each of which requires a different viscosity for proper application. Thus, the solvent could be present as an amount of from 0–90% by weight of the total composition.

After coating, the collector is subjected to heating at a temperature which may range from about 600° to 750° F. (315.6° to 398.9° C.) for a period of from about 5 to 30 minutes. This heating operation pyrolyzes the coating, producing a carbon black pigmented varnish.

Clearly, the solar collector must be formed from a material which can withstand the temperatures of pyrolysis. Suitable solar collector materials include metals, such as aluminum and steel.

The resulting coating has an absorptance preferably in excess of about 0.9 and an emittance preferably less than about 0.4. The low emittance results from the thinness of the coating after pyrolysis. After pyrolysis, the coating has a thickness of less than 2 micrometers, and preferably about 0.5 micrometers.

Additionally, a silicone or fluorocarbon may be added to the coating composition, in an amount up to about 10% by weight of the coating composition. These materials produce a hydrophobic surface, producing increased corrosion resistance for the collector.

EXAMPLES

| Example | Coating | Pyrolysis | $\alpha$ | $\epsilon$ | Corrosion Test* |
|---|---|---|---|---|---|
| 1 | 1 | 15 min. @ 750° F. | .922 | .430 | sl. spalling |
| 2 | 2 | 10 min. @ 600° F. | .810 | .315 | no change |
| 3 | 2 | 20 min. @ 600° F. | .860 | .335 | no change |
| 4 | 2 | 30 min. @ 600° F. | .853 | .340 | no change |
| 5 | 2 | 10 min. @ 650° F. | .905 | .337 | no change |
| 6 | 2 | 20 min. @ 650° F. | .900 | .271 | no change |
| 7 | 2 | 30 min. @ 650° F. | .910 | .307 | no change |
| 8 | 2 | 10 min. @ 700° F. | .901 | .250 | no change |
| 9 | 2 | 20 min. @ 700° F. | .912 | .234 | no change |
| 10 | 2 | 30 min. @ 700° F. | .908 | .198 | no change |
| 11 | 2 | 10 min. @ 750° F. | .912 | .201 | no change |
| 12 | 2 | 20 min. @ 750° F. | .908 | .263 | sl. fade |
| 13 | 2 | 30 min. @ 750° F. | .908 | .161 | no change |
| 14 | 3 | 10 min. @ 750° F. | .916 | .369 | no change |
| 15 | 3 | 10 min. @ 750° F. | .916 | .280 | mild fade |
| 16 | 4 | 10 min. @ 750° F. | .921 | .395 | 30% spalling |
| 17 | 4 | 10 min. @ 750° F. | .920 | .393 | not tested |
| 18 | 5 | 15 min. @ 750° F. | .933 | .370 | not tested |
| 19 | 6 | 15 min. @ 750° F. | .926 | .441 | not tested |
| 20 | 7 | 15 min. @ 750° F. | .915 | .280 | not tested |
| 21 | 8 | 15 min. @ 750° F. | .922 | .413 | not tested |
| 22 | 9 | 15 min. @ 750° F. | .929 | .410 | not tested |
| 23 | 10 | 15 min. @ 750° F. | .923 | .380 | not tested |
| 24 | 11 | 15 min. @ 750° F. | .924 | .465 | not tested |
| 25 | 12 | 15 min. @ 750° F. | .928 | .365 | not tested |

Coating Material
1. Tung oil
2. 50/50 (by volume) palm oil and mineral oil in toluene
3. 50/50 (by volume) palm oil and mineral oil
4. 60/40 (by volume) palm oil and mineral oil in toluene
5. Soybean oil
6. Corn oil
7. Castor oil
8. Butterfat
9. Lard
10. Beeswax
11. Heavy petroleum oil
12. Vinyl polymer
*18-day condensing-humidity corrosion test.

From the foregoing, it is clear that the present invention provides a simple, yet effective and low cost selective solar coating for solar collectors.

While the present invention has been described with reference to certain specific embodiments thereof, it is not intended to be so limited thereby, except as set forth in the accompanying claims.

I claim:

1. A solar collector comprising an aluminum or steel solar energy collection surface, said collection surface having a selective solar coating thereon, said coating comprising an organic material having a high carbon content and a high molecular weight and being selected from the group consisting of tung oil, castor oil, corn oil, soybean oil, palm oil, lard, butterfat, beeswax, vinyl polymers and petroleum oils, said coating having been pyrolyzed to produce a carbon black pigmented varnish having an absorptance of at least about 0.9 and an emittance not higher than about 0.4.

2. The collector of claim 1 wherein said coating comprises a mixture of said organic materials.

3. The collector of either claim 1 or 2 wherein said coating further comprises a solvent.

4. The collector of claim 3 wherein said solvent is selected from the group consisting of toluene, kerosene and mineral spirits.

5. The collector of claim 4 wherein said coating further comprises up to about 10% by weight of a silicone or fluorocarbon.

6. The collector of claim 4 wherein said coating has a thickness less than 2 micrometers.

* * * * *